(12) United States Patent  
Sun

(10) Patent No.: US 12,416,954 B2
(45) Date of Patent: Sep. 16, 2025

(54) APPARATUS, METHOD, DEVICE AND SYSTEM FOR POWER TRANSMISSION BASED ON POWER MANAGEMENT, AND MEDIUM

(71) Applicant: SUZHOU METABRAIN INTELLIGENT TECHNOLOGY CO., LTD., Suzhou (CN)

(72) Inventor: Hui Sun, Suzhou (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/718,156

(22) PCT Filed: Jun. 24, 2022

(86) PCT No.: PCT/CN2022/101132
§ 371 (c)(1),
(2) Date: Jun. 10, 2024

(87) PCT Pub. No.: WO2023/184742
PCT Pub. Date: Oct. 5, 2023

(65) Prior Publication Data
US 2025/0044846 A1  Feb. 6, 2025

(30) Foreign Application Priority Data
Mar. 31, 2022  (CN) .......................... 202210331111.5

(51) Int. Cl.
*G06F 1/26* (2006.01)
*G06F 1/18* (2006.01)
(Continued)

(52) U.S. Cl.
CPC ................ *G06F 1/26* (2013.01); *G06F 1/189* (2013.01); *G06F 1/28* (2013.01); *G06F 1/30* (2013.01)

(58) Field of Classification Search
CPC ..... G06F 1/26; G06F 1/30; G06F 1/28; G06F 1/189
(Continued)

(56) References Cited

U.S. PATENT DOCUMENTS 8,990,594 B2* 3/2015 Wu ...................... G06F 9/44557
713/1
2016/0231802 A1* 8/2016 Jenne .................... G06F 1/3206
(Continued)

FOREIGN PATENT DOCUMENTS

CN   110783910 A   2/2020
CN   211626511 U   10/2020
(Continued)

OTHER PUBLICATIONS

International Search Report for PCT/CN2022/101132 mailed on Dec. 29, 2022.

*Primary Examiner* — Ji H Bae
(74) *Attorney, Agent, or Firm* — Dennemeyer & Associates LLC

(57) ABSTRACT

Disclosed are an apparatus, method, device and system for power transmission based on Psys, and a medium, relating to the technical field of circuits. Said apparatus comprises: a PSU, an E-Fuse chip, a current detection circuit, a VR chip and a CPU. The current detection circuit at least comprises a first operational amplifier. The E-Fuse chip is connected to the PSU, and converts an output voltage signal of the PSU into an output current signal. The output current signal (Continued)

amplified by a preset multiple is received by the first operational amplifier, and the VR chip receives the output voltage signal of the PSU.

20 Claims, 6 Drawing Sheets

(51) Int. Cl.
  *G06F 1/28* (2006.01)
  *G06F 1/30* (2006.01)
(58) Field of Classification Search
  USPC .......................................... 713/300; 714/14
  See application file for complete search history.

(56) References Cited

U.S. PATENT DOCUMENTS

| | | |
|---|---|---|
| 2017/0025841 A1* | 1/2017 | Johansson ................ G05B 9/02 |
| 2017/0110874 A1* | 4/2017 | van Dijk .................. H02H 3/08 |
| 2017/0244261 A1* | 8/2017 | Chen ..................... H02J 7/0013 |
| 2019/0033349 A1 | 1/2019 | Michna et al. |
| 2020/0076186 A1 | 3/2020 | Wang |
| 2022/0208656 A1* | 6/2022 | Upadhyaya ....... H01L 23/49524 |

FOREIGN PATENT DOCUMENTS

| | | | |
|---|---|---|---|
| CN | 111966563 A | 11/2020 | |
| CN | 113064097 A | 7/2021 | |
| CN | 113866498 A | 12/2021 | |
| CN | 113868040 A | 12/2021 | |

* cited by examiner

APPARATUS, METHOD, DEVICE AND SYSTEM FOR POWER TRANSMISSION BASED ON POWER MANAGEMENT, AND MEDIUM

CROSS-REFERENCE TO RELATED APPLICATIONS

This is a 35 U.S.C. 371 National Stage Patent Application of International Application No. PCT/CN2022/101132, filed Jun. 24, 2022, which claims priority to Chinese application 202210331111.5, filed Mar. 31, 2022, each of which is hereby incorporated by reference in its entirety.

TECHNICAL FIELD

The present disclosure relates to the technical field of circuits, and in particular, to an apparatus, method, device and system for power transmission based on Psys, and a medium.

BACKGROUND

In order to solve the problems that if a Power Supply Unit (PSU) is selected according to the power under instantaneous maximum overclocking of a CPU, a large amount of cost waste will be caused, and also, the selection will be limited by the development of the PSU, which causes a problem that it is difficult to select a PSU, in related art, the Intel Corporation has proposed a Psys (Power in System)-based design solution, which is used to protect the PSU and avoid power failure and system downtime caused by overcurrent protection of the PSU when the CPU is under overclocking.

An existing CPU acquires an output power of a Power Management Bus (PMBUS), which utilizes a principle of a current mirror. The total input current of the system is collected by using an Ishare function of the PSU.

However, Ishare signals under different powers have different conversion multiples with actual output currents of the PSU, and therefore correspond to lines with different Ishare functions; and when the server is actually used, different lines are selected according to different configuration matchings for use. This requires that many lines are provided in the server, and the line design is complex and a lot of layout spaces are occupied.

SUMMARY

Some embodiments of the present disclosure provide an apparatus for power transmission based on Psys, including: a PSU, an Electronic Fuse (E-Fuse) chip, a current detection circuit, a Voltage Regulator (VR) chip and a CPU;
wherein the current detection circuit at least includes a first operational amplifier configured to amplify an output current signal by a preset multiple;
an input end of the E-Fuse chip is connected to the PSU and is configured to convert an output voltage signal of the PSU into the output current signal;
an in-phase input end of the first operational amplifier, as an input end of the current detection circuit, is connected to an output end of the E-Fuse chip, and an inverting input end of the first operational amplifier, also as the input end of the current detection circuit, is grounded;
an input end of the VR chip is connected to an output end of the first operational amplifier, and the output end of the first operational amplifier, as an output end of the current detection circuit, is configured to receive the output current signal amplified by the preset multiple;
the input end of the VR chip is connected to the PSU and is configured to receive the output voltage signal of the PSU; and
an output end of the VR chip is connected to the CPU, and is configured to convert the output current signal amplified by the preset multiple and the output voltage signal into output power consumption, and transmit same to the CPU.

In some embodiments of the present disclosure, the E-Fuse chip includes: a second operational amplifier, a third operational amplifier, a first resistor and a second resistor;
an in-phase input end of the second operational amplifier and an inverting input end of the second operational amplifier are both used as the input end of the E-Fuse chip, and an output end of the second operational amplifier is connected to an in-phase input end of the third operational amplifier; an inverting input end of the third operational amplifier is connected to a common end formed by a first end of the first resistor and a first end of the second resistor, a second end of the second resistor is grounded, and an output end of the third operational amplifier is connected to a second end of the first resistor, and a common end formed by the output end of the third operational amplifier and the second end of the first resistor is used as the output end of the E-Fuse chip.

In some embodiments of the present disclosure, the apparatus further includes: a third resistor;
a first end of the third resistor is connected to the PSU, the first end of the third resistor is connected to the inverting input end of the second operational amplifier, and a second end of the third resistor is connected to the in-phase input end of the second operational amplifier for supplying power to a rear-end load, wherein the third resistor is a precision resistor.

In some embodiments of the present disclosure, the apparatus further includes: a fourth resistor;
a first end of the fourth resistor is connected to the output end of the E-Fuse chip, and a second end of the fourth resistor is connected to the input end of the current detection circuit.

In some embodiments of the present disclosure, the current detection circuit further includes: a fifth resistor and a sixth resistor;
a common end formed by a first end of the fifth resistor and a first end of the sixth resistor is connected to the inverting input end of the first operational amplifier, a second end of the fifth resistor is grounded, and a second end of the sixth resistor is connected to the output end of the first operational amplifier.

In some embodiments of the present disclosure, the current detection circuit further includes: a seventh resistor and an eighth resistor;
a first end of the seventh resistor, as the input end of the current detection circuit, is connected to the in-phase input end of the first operational amplifier, and a second end of the seventh resistor is grounded; and a first end of the eighth resistor is connected to the output end of the first operational amplifier, and a second end of the eighth resistor, as the output end of the current detection circuit, is connected to the input end of the VR chip.

In some embodiments of the present disclosure, the apparatus further includes: a ninth resistor;

a first end of the ninth resistor is connected to the input end of the VR chip, and a second end of the ninth resistor is grounded.

In some embodiments of the present disclosure, the apparatus further includes: a first capacitor;
a first end of the first capacitor is connected to the input end of the VR chip, and a second end of the first capacitor is grounded.

In some embodiments of the present disclosure, there are multiple types of the E-Fuse chip.

In some embodiments of the present disclosure, when there are multiple types of the E-Fuse chip, a plurality of the E-Fuse chips of the same type are connected in parallel, and an output end of each type of the E-Fuse chip is connected to an input end of a different current detection circuit.

Some embodiments of the present disclosure also provide a method for power transmission based on Psys, applied to the apparatus for power transmission based on Psys as mentioned above, the method including:
an output current signal outputted by an E-Fuse chip is acquired, wherein the output current signal is obtained by converting an output voltage signal of a PSU;
the output current signal is superimposed by a first operational amplifier, and the output current signal is amplified by a preset multiple;
the output current signal amplified by the preset multiple is transmitted to a VR chip;
the output voltage signal is acquired by the VR chip, and output power consumption is obtained by using the output current signal and the output voltage signal; and
the output power consumption is transmitted to a CPU.

Some embodiments of the present disclosure also provide a device for power transmission based on Psys, applied to the apparatus for power transmission based on Psys as mentioned above, the device including:
a first acquisition component, configured to acquire an output current signal outputted by an E-Fuse chip, wherein the output current signal is obtained by converting an output voltage signal of a PSU;
a superimposition component, configured to superimpose the output current signal by a first operational amplifier, and amplify the output current signal by a preset multiple;
an amplification component, configured to transmit the output current signal amplified by the preset multiple to a VR chip;
a second acquisition component, configured to acquire the output voltage signal by the VR chip, and obtain output power consumption by using the output current signal and the output voltage signal; and
an output component, configured to transmit the output power consumption to a CPU.

Some embodiments of the present disclosure also provide a system for power transmission based on Psys, including:
a memory, for storing computer-readable instructions; and
one or more processors, for implementing, when executing the computer-readable instructions, the steps of the method for power transmission based on Psys according to any one above.

Some embodiments of the present disclosure also provide a non-transitory computer-readable storage medium, wherein computer-readable instructions are stored on the non-transitory computer-readable storage medium, and the computer-readable instructions, when executed by one or more processors, implement the steps of the method for power transmission based on Psys according to any one above.

Details of one or more embodiments of the present disclosure are proposed in the accompanying drawings and the description below. Other features and advantages of some embodiments of the present disclosure will become apparent from the description, the accompanying drawings and the claims.

BRIEF DESCRIPTION OF THE DRAWINGS

In order to illustrate the embodiments of the present disclosure more clearly, hereinafter, accompanying drawings requiring to be used in the embodiments will be briefly introduced. Apparently, the accompanying drawings in the following description merely relate to some embodiments of the present disclosure, and for a person of ordinary skill in the art, other accompanying drawings may also be obtained according to these accompanying drawings without involving any inventive effort.

Figure 1:
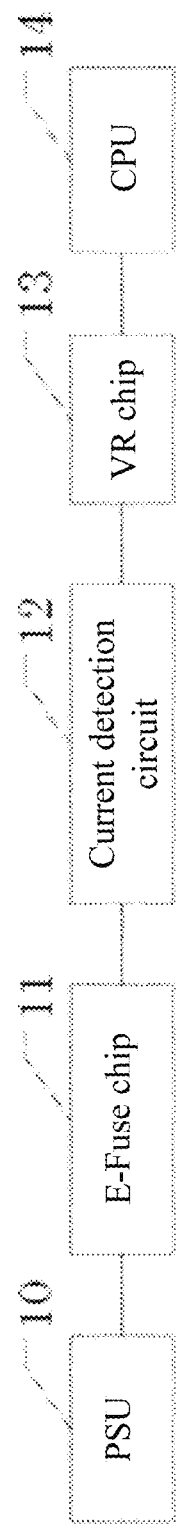
FIG. 1 is a structural diagram of an apparatus for power transmission based on Psys provided according to one or more embodiments of the present disclosure.

In which 10 refers to PSU, 11 refers to E-Fuse chip, 12 refers to current detection circuit, 13 refers to VR chip, and 14 refers to CPU.

DETAILED DESCRIPTION OF THE EMBODIMENTS

Hereinafter, the technical solutions in the embodiments of the present disclosure will be described clearly and completely with reference to the accompanying drawings of the embodiments of the present disclosure. Obviously, the embodiments as described are only some of the embodiments of the present disclosure, and are not all of the embodiments. All other embodiments obtained by a person of ordinary skill in the art on the basis of the embodiments of the present disclosure without any inventive effort shall all fall within the scope of protection of the present disclosure.

As the speed of processing data by a Central Processing Unit (CPU) increases continuously, the power of the CPU also increases continuously. At present, for the latest Eagle Stream platform of Intel Corporation, the heat dissipation design power consumption (Thermal Design Power, TDP) of the CPU reaches 350 W, and the maximum instantaneous power of the CPU under overclocking reaches 1000 W. For current technical processing, a 2-way server is generally used to achieve data processing. For the 2-way server, when two CPUs in the server work simultaneously under overclocking, the maximum instantaneous power thereof may reach 2000 W. At this time, 80% or more of the power of the PSU of the server supplies power to the CPUs. In this case, if the PSU is selected according to the TDP of the CPU, overcurrent protection may occur in the PSU when the CPU is under overclocking, resulting in power failure and system downtime; and if the PSU is selected according to the power under instantaneous maximum overclocking of the CPU, a large amount of cost waste will be caused, and also, the selection will be limited by the development of the PSU, which causes a problem that it is difficult to select a PSU.

An existing CPU acquires an output power of a Power Management Bus (PMBUS), which utilizes a principle of a current mirror. The total input current of the system is collected by using an Ishare function of the PSU. The Ishare function is mainly used for current-equalizing and transmitting a current signal when a plurality of PSUs are connected in parallel. The current signal is converted into a voltage signal with a corresponding multiple, and then the voltage signal is transmitted to a VR chip of the CPU; the VR chip synchronously collects an output voltage of the PSU, then a system power is obtained by using a formula P=U*I, and the system power is transmitted to the CPU via an SVID (System V Interface Definition) bus. When the server is actually used, different lines are selected according to different configuration matchings for use. This requires that many lines are provided in the server, and the line design is complex and a lot of layout spaces are occupied.

The core of some embodiments of the present disclosure is to provide an apparatus, method, device and system for power transmission based on Psys, and a medium, which may simplify lines while saving layout space.

To make a person skilled in the art better understand the solutions of some embodiments of the present disclosure, hereinafter, some embodiments of the present disclosure are further described in detail with reference to the accompanying drawings and the specific embodiments.

FIG. 1 is a structural diagram of an apparatus for power transmission based on Psys provided according to embodiments of the present disclosure. As shown in FIG. 1, the apparatus for power transmission based on Psys includes: a PSU 10, an E-Fuse chip 11, a current detection circuit 12, a VR chip 13 and a CPU 14; wherein the current detection circuit 12 at least includes a first operational amplifier U1 configured to amplify an output current signal by a preset multiple; an input end of the E-Fuse chip 11 is connected to the PSU 10 and is configured to convert an output voltage signal of the PSU 10 into the output current signal; an in-phase input end of the first operational amplifier U1, as an input end of the current detection circuit 12, is connected to an output end of the E-Fuse chip 11, and an inverting input end of the first operational amplifier U1, also as the input end of the current detection circuit 12, is grounded; an input end of the VR chip 13 is connected to an output end of the first operational amplifier U1, and the output end of the first operational amplifier U1, as an output end of the current detection circuit 12, is configured to receive the output current signal amplified by the preset multiple; the input end of the VR chip 13 is connected to the PSU 10 and is configured to receive the output voltage signal of the PSU 10; and an output end of the VR chip 13 is connected to the CPU 14, and is configured to convert the output current signal amplified by the preset multiple and the output voltage signal into output power consumption, and transmit same to the CPU 14.

In some embodiments of the present disclosure, an E-Fuse chip is a type of programmable electronic fuse, and it is also a non-volatile memory device used for storing information and protecting chips. The VR chip in multiphase power systems, through programming and protective mechanisms, is capable of converting high voltages to low voltages suitable for microelectronic devices such as CPUs.

The input end of the E-Fuse chip 11 is connected to the PSU 10 and is configured to convert the output voltage signal of the PSU 10 into the output current signal. Moreover, the output current signal amplified by the preset multiple is received by the first operational amplifier U1 in the current detection circuit 12, and the VR chip 13 receives the output voltage signal of the PSU 10 at the same time. In this case, regardless of the power of the PSU 10, the amplified output current signal may be obtained by the E-Fuse chip 11 and the first operational amplifier U1; and it is not necessary to calculate an output power by providing a plurality of lines according to PSUs 10 with different powers of different configuration matchings, and the output power consumption may be obtained by the amplified output current signal and the output voltage signal of the PSU 10, and the output power consumption may be transmitted to the CPU 14. Hence, the purpose of simplifying a line may be achieved by using the E-Fuse chip 11 and the current detection circuit 12, while saving the layout space.

Figure 2:
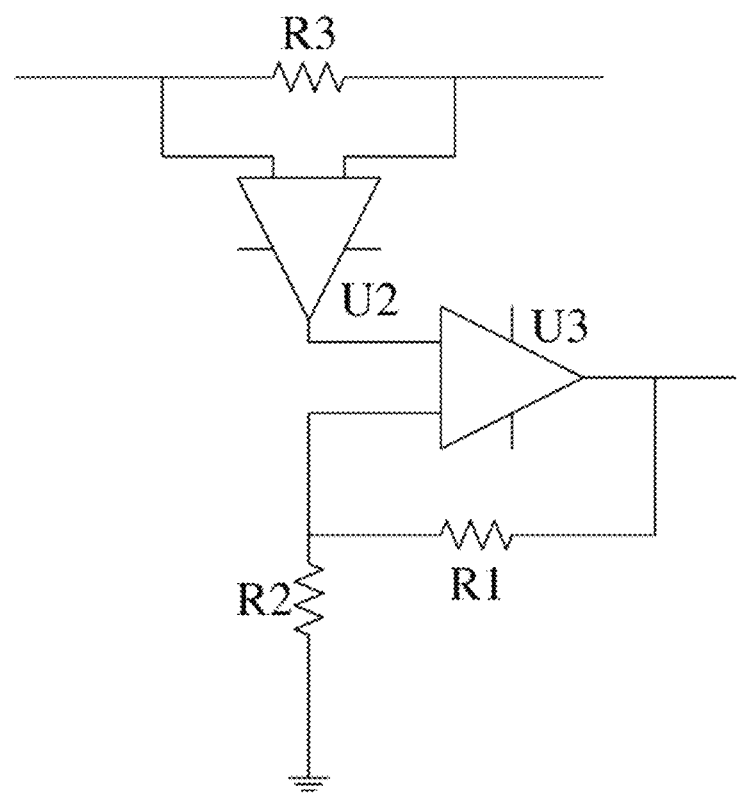
FIG. 2 is a circuit diagram of an E-Fuse chip provided according to one or more embodiments of the present disclosure.

FIG. 2 is a circuit diagram of an E-Fuse chip provided according to embodiments of the present disclosure. On the basis of the described embodiments, as an embodiment of the present disclosure, as shown in FIG. 2, the E-Fuse chip 11 includes: a second operational amplifier U2, a third operational amplifier U3, a first resistor R1 and a second resistor R2.

An in-phase input end of the second operational amplifier U2 and an inverting input end of the second operational amplifier U2 are both used as the input end of the E-Fuse chip 11, and an output end of the second operational amplifier U2 is connected to an in-phase input end of the third operational amplifier U3; an inverting input end of the third operational amplifier U3 is connected to a common end formed by a first end of the first resistor R1 and a first end of the second resistor R2, a second end of the second resistor R2 is grounded, and an output end of the third operational amplifier U3 is connected to a second end of the first resistor R1, and a common end formed by the output end of the third operational amplifier U3 and the second end of the first resistor R1 is used as the output end of the E-Fuse chip 11.

The voltage across two ends of the PSU 10 is collected by the second operational amplifier U2, the voltage value outputted by the second operational amplifier U2 is transmitted to the third amplifier, voltage-to-current conversion in a multiple relationship is performed, and an output current signal is obtained from the output end of the third operational amplifier U3. In this case, the output voltage signal of the PSU 10 is converted into the output current signal by the E-Fuse chip 11, so that conversion from voltage to current is achieved, and there is a certain multiple relationship between the obtained output current signal and the output voltage signal of the PSU 10.

As an embodiment of the present disclosure, the apparatus further includes: a third resistor R3.

A first end of the third resistor R3 is connected to the PSU 10, the first end of the third resistor R3 is connected to the inverting input end of the second operational amplifier U2, and a second end of the third resistor R3 is connected to the in-phase input end of the second operational amplifier U2 for supplying power to a rear-end load, wherein the third resistor R3 is a precision resistor.

In some embodiments of the present disclosure, the purpose of providing the third resistor R3 as a precision resistor is to make the obtained output voltage signal of the PSU 10 more accurate, so that the output current signal subsequently obtained from the output end of the E-Fuse chip 11 is more accurate. The precision resistor is placed on a power source path and is used for detecting an output current signal on the power source path; the E-Fuse chip 11 collects the voltage across two ends of the precision resistor, obtains an output voltage signal across at two ends of the precision resistor after processed by a subtractor, and amplifies the output voltage signal by means of the third operational amplifier U3 and then outputs same to the output end of the E-Fuse chip 11. The subtractor mentioned here is the second operational amplifier U2.

In this way, an output voltage signal having a proportional relationship with the output current signal flowing through the precision resistor may be obtained at the output end of the E-Fuse chip 11. For example, if the resistance value of the precision resistor is R, the current flowing through the precision resistor is I, the amplification factor of the third operational amplifier U3 in the E-Fuse chip 11 is n, and then the voltage at the output end of the E-Fuse chip 11 at this time may be calculated by a formula $V=n*I*R$.

Figure 3:
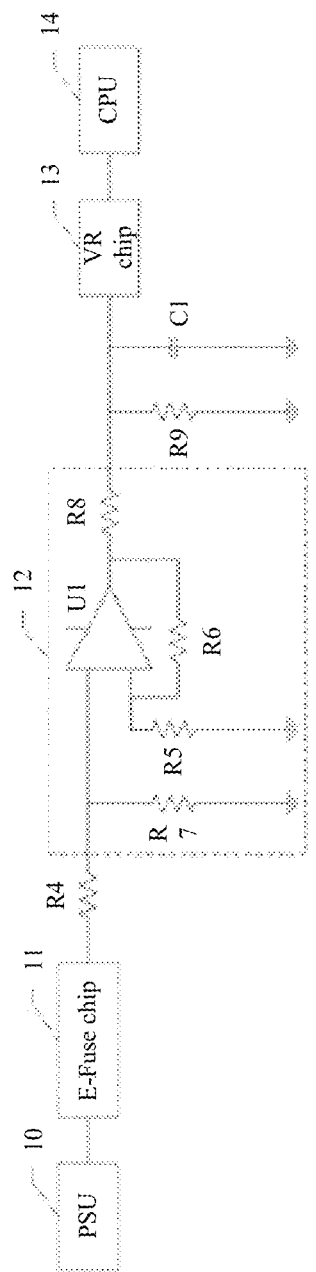
FIG. 3 is a circuit diagram of an apparatus for power transmission based on Psys provided according to one or more embodiments of the present disclosure.

For scenarios with a low power of a server system, only one E-Fuse chip 11 needs to be provided in the apparatus, to meet working of the apparatus. FIG. 3 is a circuit diagram of an apparatus for power transmission based on Psys provided according to embodiments of the present disclosure. On the basis of the described embodiments, as an embodiment of the present disclosure, as shown in FIG. 3, the apparatus further includes: a fourth resistor R4.

A first end of the fourth resistor R4 is connected to the output end of the E-Fuse chip 11, and a second end of the fourth resistor R4 is connected to the input end of the current detection circuit 12. In the embodiments of the present disclosure, the fourth resistor R4 achieves a voltage division effect, in order to prevent the output voltage signal of the PSU 10 from being too large so that the subsequent circuit may not withstand the output voltage signal, the circuit is damaged and may not work. The type, resistance value and operating environment of the fourth resistor R4 are not limited, and implementations thereof may be determined according to specific implementation scenarios.

As an embodiment of the present disclosure, the current detection circuit 12 further includes: a fifth resistor R5 and a sixth resistor R6.

A common end formed by a first end of the fifth resistor R5 and a first end of the sixth resistor R6 is connected to the inverting input end of the first operational amplifier U1, a second end of the fifth resistor R5 is grounded, and a second end of the sixth resistor R6 is connected to the output end of the first operational amplifier U1.

In some embodiments of the present disclosure, the fifth resistor R5 and the sixth resistor R6 achieve the effect of adjusting the amplification factor. The types, resistance values and operating environments of the fifth resistor R5 and the sixth resistor R6 are not limited, and implementations thereof may be determined according to specific implementation scenarios.

As an embodiment of the present disclosure, the current detection circuit 12 further includes: a seventh resistor R7 and an eighth resistor R8.

A first end of the seventh resistor R7, as the input end of the current detection circuit 12, is connected to the in-phase input end of the first operational amplifier U1, and a second end of the seventh resistor R7 is grounded; and a first end of the eighth resistor R8 is connected to the output end of the first operational amplifier U1, and a second end of the eighth resistor R8, as the output end of the current detection circuit 12, is connected to the input end of the VR chip 13.

In the embodiments of the present disclosure, the seventh resistor R7 and the eighth resistor R8 achieve a voltage division effect. The types, resistance values and operating environments of the seventh resistor R7 and the eighth resistor R8 are not limited, and implementations thereof may be determined according to specific implementation scenarios.

As an embodiment of the present disclosure, the apparatus further includes: a ninth resistor R9;
a first end of the ninth resistor R9 is connected to the input end of the VR chip 13, and a second end of the ninth resistor R9 is grounded.

In the embodiments of the present disclosure, the ninth resistor R9 achieves a voltage division effect. The type, resistance value and operating environment of the ninth resistor R9 are not limited, and implementations thereof may be determined according to specific implementation scenarios.

As an embodiment of the present disclosure, the apparatus further includes: a first capacitor C1;
a first end of the first capacitor C1 is connected to the input end of the VR chip 13, and a second end of the first capacitor C1 is grounded. In the embodiments of the present disclosure, the first capacitor C1 achieves a filtering effect. The type, capacitance value and operating environment of the first capacitor C1 are not limited, and implementations thereof may be determined according to specific implementation scenarios.

It should be noted that, the situation in which the fourth resistor R4, the fifth resistor R5, the sixth resistor R6, the seventh resistor R7, the eighth resistor R8, the ninth resistor R9, and the first capacitor C1 as mentioned above are all applied in one embodiment is as follows:
when an output voltage signal P12V_PSU of the PSU 10 passes through only one E-Fuse chip 11 and converts the output voltage signal to 12V, the output end of the E-Fuse chip 11 is connected to the in-phase input end of the first operational amplifier U1 by the fourth resistor R4 and is grounded by the seventh resistor R7. In this case, the fourth resistor R4 and the seventh resistor R7 are voltage-dividing resistors for dividing a voltage of the output voltage signal of the output end of the E-Fuse chip 11; and in this case, the voltage Ue at the output end of the E-Fuse chip 11 is: $Ue=U*R7/(R4+R7)$, where U is 12V. The voltage division by the fourth resistor R4 and the seventh resistor R7 is to avoid damage to the in-phase input end of the first operational amplifier U1 due to too high output voltage of the output end of the E-Fuse chip 11, which renders that the first operational amplifier U1 may not work normally.

The fifth resistor R5 and the sixth resistor R6 at the inverting input end of the first operational amplifier U1 implement adjustment and control of the operational amplification factor, so that the output voltage U1 at the output end of the first operational amplifier U1 establishes a relationship with the voltage Ue at the output end of the E-Fuse chip 11, wherein the relationship is: $U1=U*R7*(R5+R6)/R5/(R4+R7)$. The eighth resistor R8 and the ninth resistor R9 are voltage-dividing resistors, and likewise, are used to ensure that normal operation of the VR chip 13 is not damaged. The first capacitor C1 is a filter capacitor, which is used for preventing other interference caused by an excessively long signal wiring, and may also shield high-frequency fluctuation on the wiring. The relationship between a voltage Ur finally flowing into the VR chip 13 and the voltage Ue at the output end of the E-Fuse chip 11 is: Ur=U*R7*(R5+R6)/R5/(R4+R7)*R9/(R8+R9). After obtaining the voltage signal, the VR chip 13 converts the output voltage signal into an output current signal again according to the operational relationship above.

Moreover, the VR chip 13 collects the output voltage signal of the output voltage signal P12V_PSU of the PSU 10, calculates the collected output voltage signal and output current signal through P=U*I, and uses the obtained calculation result as an output power of the system, and finally the VR chip 13 transmits the output power to the CPU 14 by an SVID bus. In this way, the CPU 14 finally acquires the system power.

Figure 4:
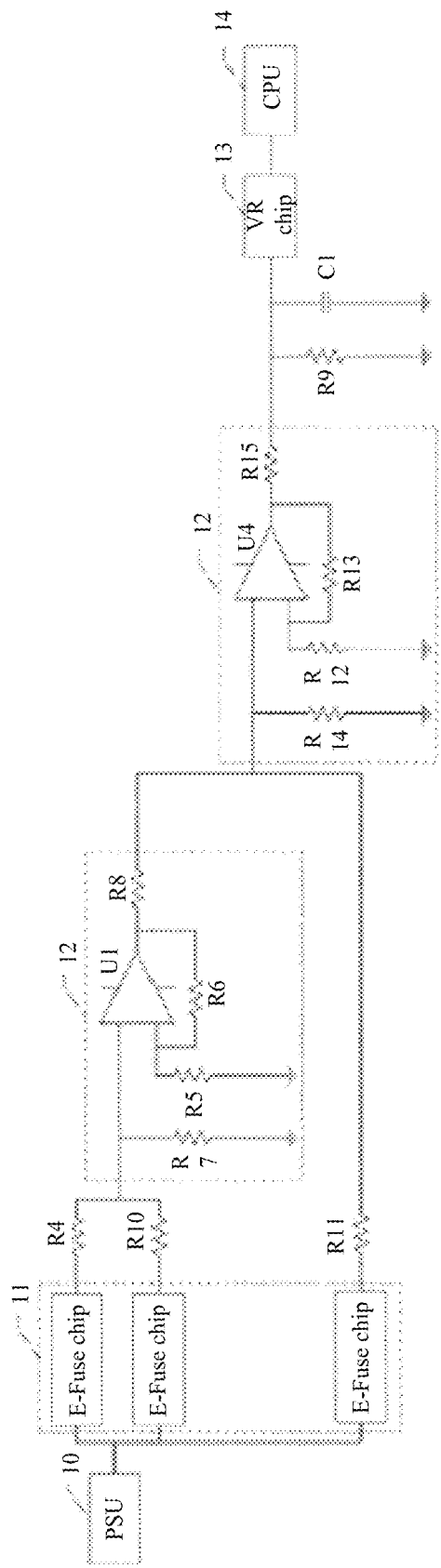
FIG. 4 is a circuit diagram of another apparatus for power transmission based on Psys provided according to one or more embodiments of the present disclosure.

FIG. 4 is a circuit diagram of another apparatus for power transmission based on Psys provided according to embodiments of the present disclosure. On the basis of the described embodiments, as an embodiment of the present disclosure, as shown in FIG. 4, for scenarios with a large power of a server system, multiple types of E-Fuse chips 11 need to be provided in the system. When there are multiple types of the E-Fuse chip 11, a plurality of the E-Fuse chips 11 of the same type are connected in parallel, and an output end of each type of the E-Fuse chip 11 is connected to an input end of a different current detection circuit 12.

In most cases, in the apparatus for power transmission based on Psys, a plurality of E-Fuse chips of the same type are used in parallel, so as to reduce the current on each E-Fuse chip, thereby improving the reliability of the apparatus. Embodiments in which two E-Fuse chips are used in parallel are described as follows:

when E-Fuse chips of the same type are used in parallel, an output voltage signal P12V_PSU outputted by the PSU, as shown in FIG. 4, is converted into a first output voltage signal and a second output voltage signal after passing through the two E-Fuse chips; and the implementation is consistent with the implementation of the apparatus including one E-Fuse chip, and the main difference lies in that: output ends of the two E-Fuse chips need to be connected. A second current detection circuit is composed of a twelfth resistor R12, a thirteenth resistor R13, a fourteenth resistor R14, a fifteenth resistor R15 and a fourth operational amplifier U4. A first end of the fourteenth resistor R14 serves as an input end of the second current detection circuit, a second end of the fourteenth resistor R14 is grounded, and the first end of the fourteenth resistor R14 is connected to an in-phase input end of the fourth operational amplifier U4; a first end of the twelfth resistor R12 is connected to an inverting input end of the fourth operational amplifier U4, and a second end of the twelfth resistor R12 is grounded; a first end of the thirteenth resistor R13 is connected to the inverting input end of the fourth operational amplifier U4, and a second end of the thirteenth resistor R13 is connected to an output end of the fourth operational amplifier U4; and the output end of the fourth operational amplifier U4 is connected to a first end of the fifteenth resistor R15, and a second end of the fifteenth resistor R15 serves as an output end of the second current detection circuit.

As shown in FIG. 4, an output end of the first E-Fuse chip is externally connected to the fourth resistor R4, and an output end of the second E-Fuse chip is externally connected to a tenth resistor R10; and the second end of the fourth resistor R4 and a second end of the tenth resistor R10 are connected and then connected to the in-phase input end of the first operational amplifier U1. An output end of the third E-Fuse chip is externally connected to an eleventh resistor R11. When an output voltage of the output end of the first E-Fuse chip is Ua, and an output voltage of the output end of the second E-Fuse chip is Ub, at this time, a relationship between the voltage U1a of the in-phase input end of the first operational amplifier U1, Ua and Ub is: U1a/R7=(Ua−U1a)/R4+(Ub−U1a)/R10. U1a is amplified and isolated by the first operational amplifier U1, then divided by the ninth resistor R9 and the fifteenth resistor R15, and finally transferred to the VR chip 13.

Use of a plurality of E-Fuse chips of the same type connected in parallel is the same as the application of two parallel chips, output ends of all the E-Fuse chips connected in parallel may be connected to each other through an external series resistor, and then connected to the in-phase input end of the first operational amplifier U1.

For a scenario in which different types of E-Fuse chips are connected in parallel, because output ends of different E-Fuse chips have different amplification factors, they may not continue to use a parallel connection manner, and Psys-based power transmission may be achieved by increasing the number of stages of operational amplification:

In FIG. 4, the first E-Fuse chip and the second E-Fuse chip are E-Fuse chips of the same type, but the third E-Fuse chip is an E-Fuse chip of different type from the first E-Fuse chip and the second E-Fuse chip, and the amplification factors of the output ends of the first E-Fuse chip and the second E-Fuse chip are different from that of the third E-Fuse chip; in order to transmit power by means of the apparatus for power transmission based on Psys, in some embodiments of the present disclosure, an output voltage signal obtained after output voltages of the output ends of the first E-Fuse chip and the second E-Fuse chip are subjected to first-stage operational amplifier amplification processing, is subjected to second-stage operational amplifier amplification together with an output voltage signal of an output end of the third E-Fuse chip, and then is connected to the VR chip 13, so as to distinguish different amplification factors.

If E-Fuse chips of multiple different types are used in the apparatus, the manner as mentioned above may be used, and whenever one type of E-Fuse chips is added, one stage of operational amplifier amplification is added, and finally the collection of output current signals by all types of E-Fuse chips is realized, so as to realize power transmission by the apparatus for power transmission based on Psys.

Figure 5:
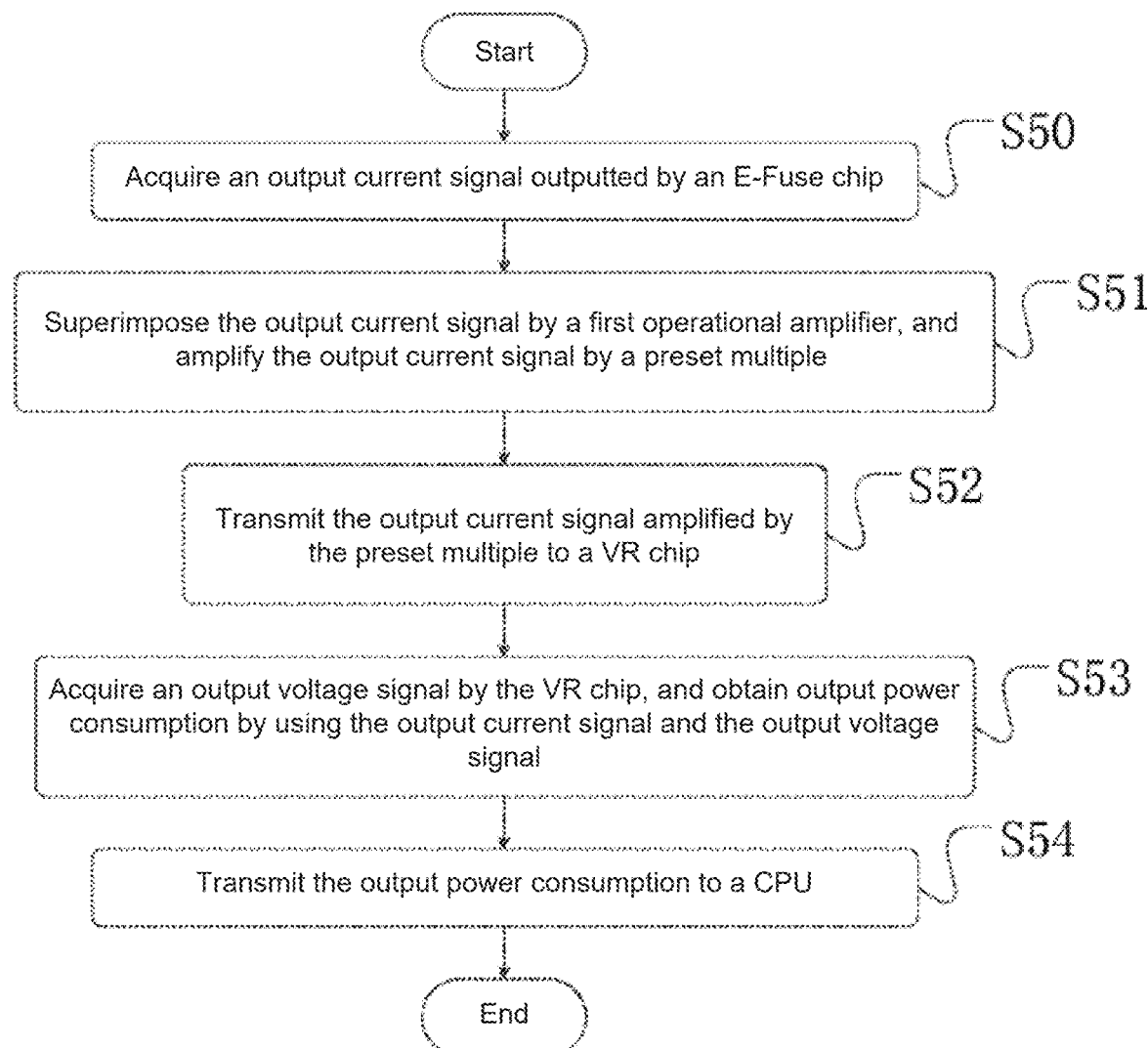
FIG. 5 is a flowchart of a method for power transmission based on Psys provided according to one or more embodiments of the present disclosure.

In order to solve the described technical problems, some embodiments of the present disclosure also provide a method for power transmission based on Psys. FIG. 5 is a flowchart of a method for power transmission based on Psys provided according to embodiments of the present disclosure.

As shown in FIG. 5, the method is applied to the apparatus for power transmission based on Psys, and the method includes:
S50: an output current signal outputted by an E-Fuse chip is acquired,
wherein the output current signal is obtained by converting an output voltage signal of a PSU.
S51: the output current signal is superimposed by a first operational amplifier, and the output current signal is amplified by a preset multiple.
S52: the output current signal amplified by the preset multiple is transmitted to a VR chip.

S53: the output voltage signal is acquired by the VR chip, and output power consumption is obtained by using the output current signal and the output voltage signal.

S54: the output power consumption is transmitted to a CPU.

In the embodiment of the present disclosure, all signals outputted in the middle may be digital signals. The digital signals may be high and low levels of signals, and may also be digital signals such as 4-bit, 8-bit, 16-bit, etc., such as a digital signal in the form of "00111101". It may be understood that the digital signal mentioned above is only one of many embodiments of the present disclosure, and does not impose any limitation on the digital signal.

In the described embodiments, the method for power transmission based on Psys has been described in detail, and some embodiments of the present disclosure further provide embodiments corresponding to a device for power transmission based on Psys.

Figure 6:
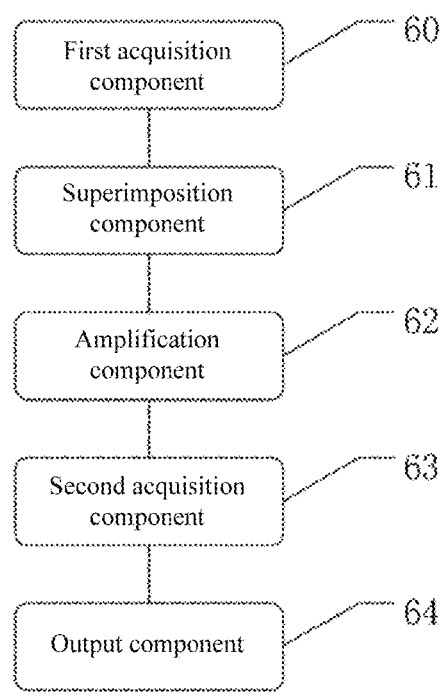
FIG. 6 is a structural diagram of a device for power transmission based on Psys provided according to one or more embodiments of the present disclosure.

FIG. 6 is a structural diagram of a device for power transmission based on Psys provided according to embodiments of the present disclosure. As shown in FIG. 6, some embodiments of the present disclosure also provide a device for power transmission based on Psys, applied to the apparatus for power transmission based on Psys as mentioned above, the device including:
- a first acquisition component 60, configured to acquire an output current signal outputted by an E-Fuse chip, wherein the output current signal is obtained by converting an output voltage signal of a PSU;
- a superimposition component 61, configured to superimpose the output current signal by a first operational amplifier, and amplify the output current signal by a preset multiple;
- an amplification component 62, configured to transmit the output current signal amplified by the preset multiple to a VR chip;
- a second acquisition component 63, configured to acquire the output voltage signal by the VR chip, and obtain output power consumption by using the output current signal and the output voltage signal; and
- an output component 64, configured to transmit the output power consumption to a CPU.

The embodiments of the device part correspond to the embodiments of the method part; therefore, for the embodiments of the device part, reference may be made to the illustration of the embodiments of the method part, and they will not be repeated herein again.

Figure 7:
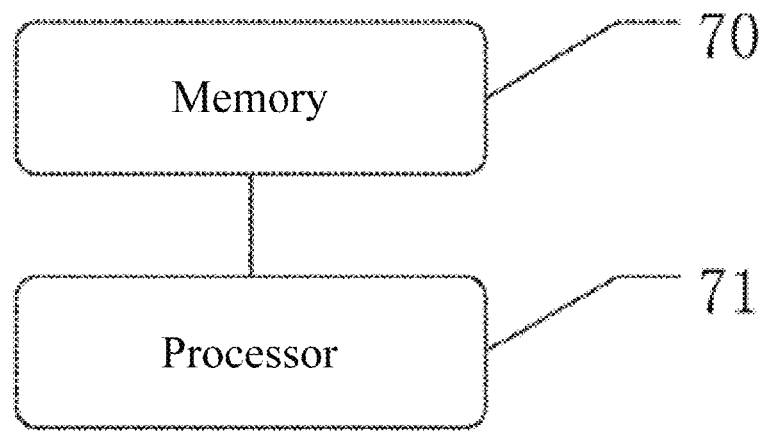
FIG. 7 is a structural diagram of a system for power transmission based on Psys provided according to one or more embodiments of the present disclosure.

FIG. 7 is a structural diagram of a system for power transmission based on Psys provided according to embodiments of the present disclosure. As shown in FIG. 7, the system for power transmission based on Psys includes:
- a memory 70, for storing computer-readable instructions; and
- one or more processors 71, for implementing, when executing the computer-readable instructions, the steps of the method for power transmission based on Psys according to any one of the embodiments above.

The system for power transmission based on Psys provided in the embodiment may include, but is not limited to, a smartphone, a tablet computer, a notebook computer, a desktop computer, or the like.

The processors 71 may include one or more processing cores, such as a 4-core processor and an 8-core processor. The processors 71 may be implemented in at least one hardware form of Digital Signal Processing (DSP), Field-Programmable Gate Array (FPGA), or Programmable Logic Array (PLA). The processors 71 may also include a main processor and a co-processor, wherein the main processor is a processor for processing data in a wake-up state, and is also referred to as a Central Processing Unit (CPU); and the co-processor is a low-power-consumption processor for processing data in a standby state. In some embodiments of the present disclosure, the processors 71 may be integrated with an image processor (Graphics Processing Unit, GPU), and the GPU is responsible for rendering and drawing content required to be displayed on a display screen. In some embodiments of the present disclosure, the processors 71 may further include an Artificial Intelligence (AI) processor, and the AI processor is configured to process calculation operations related to machine learning.

The memory 70 may include one or more non-transitory computer-readable storage media, the non-transitory computer-readable storage media may be non-transient. The memory 70 may also include a high-speed random access memory, as well as a non-transitory memory, such as one or more magnetic disk storage devices, flash memory storage devices. In the embodiment of the present disclosure, the memory 70 is at least used to store the following computer-readable instructions, wherein after the computer-readable instructions are loaded and executed by the one or more processors 71, the steps related to the method for power transmission based on Psys disclosed in any one of the embodiments above may be implemented. In addition, resources stored in the memory 70 may further include an operating system and data, and the storage manner may be temporary storage or permanent storage. The operating system may include Windows, Unix, Linux, and the like.

In some embodiments of the present disclosure, the system for power transmission based on Psys may also include a display screen, an input/output interface, a communication interface, a power source and a communication bus.

A person skilled in the art may understand that the structure as shown in FIG. 7 does not limit the system for power transmission based on Psys, and may include more or less assemblies than those shown in the figure.

The system for power transmission based on Psys provided in the embodiments of the present disclosure includes a memory 70 and a processor 71, wherein the processor 71 may implement the method for power transmission based on Psys when executing readable instructions stored in the memory 70.

Finally, some embodiments of the present disclosure further provide embodiments corresponding to a non-transitory computer-readable storage medium. The non-transitory computer-readable storage medium stores computer-readable instructions, and the computer-readable instructions, when executed by one or more processors, implement the steps described in the foregoing method embodiments.

It should be understood that, if the method in the foregoing embodiments is implemented in the form of a software functional component and sold or used as an independent product, it may be stored in a computer-readable storage medium. On the basis of such understanding, the part of the technical solutions of the present disclosure that contributes in essence or to the related art or part or all of the technical solutions may be embodied in the form of a software product. The computer software product is stored in a storage medium and executes all or some of the steps of the method described in various embodiments of the present disclosure. Moreover, the storage medium above includes: various media that may store program codes, such as a USB flash disk, a removable hard disk, a Read-Only Memory (ROM), a Random Access Memory (RAM), a magnetic disk, or an optical disc.

Hereinabove, the apparatus, method, device and system for power transmission based on Psys, and the medium provided in some embodiments of the present disclosure have been introduced in detail. Various embodiments in the description are described in a progressive manner. Each embodiment focuses on differences from other embodiments. For the same or similar parts among the embodiments, reference may be made to each other. For the apparatus disclosed in the embodiments, as the apparatus corresponds to the method disclosed in the embodiments, the illustration thereof is relatively simple, and for the related parts, reference may be made to the illustration of the method part. It should be noted that, a person of ordinary skill in the art may further make improvements and modifications to some embodiments of the present disclosure without departing from the principle of the present disclosure, and these improvements and modifications also belong to the scope of protection of the claims of the present disclosure.

It should be noted that in the present description, relational terms such as first and second, etc. are only used to distinguish one entity or operation from another entity or operation, and do not necessarily require or imply any actual relationship or sequence between these entities or operations. Furthermore, terms "include", "including", or any other variations thereof are intended to cover a non-exclusive inclusion, so that a process, a method, an article, or a device that includes a series of elements not only includes those elements, but also includes other elements that are not explicitly listed, or further includes inherent elements of the process, the method, the article, or the device. Without further limitation, an element defined by a sentence "including a . . . " does not exclude other same elements existing in the process, the method, the article, or the device that includes the element.

The invention claimed is:

1. An apparatus for power transmission based on Power Management, comprising: a Power Supply Unit (PSU), one or more Electronic Fuse (E-Fuse) chips, a current detection circuit, a Voltage Regulator (VR) chip and a Central Processing Unit (CPU);
   wherein the current detection circuit at least comprises a first operational amplifier configured to amplify an output current signal by a preset multiple;
   an input end for each of the one or more E-Fuse chips is connected to the PSU and is configured to convert an output voltage signal of the PSU into the output current signal;
   an in-phase input end of the first operational amplifier, as an input end of the current detection circuit, is connected to an output end for each of the one or more E-Fuse chips, and an inverting input end of the first operational amplifier, also as the input end of the current detection circuit, is grounded;
   an input end of the VR chip is connected to an output end of the first operational amplifier, and the output end of the first operational amplifier, as an output end of the current detection circuit, is configured to receive the output current signal amplified by the preset multiple;
   the input end of the VR chip is connected to the PSU and is configured to receive the output voltage signal of the PSU; and
   an output end of the VR chip is connected to the CPU, and is configured to convert the output current signal amplified by the preset multiple and the output voltage signal into output power consumption, and transmit the output power consumption to the CPU.

2. The apparatus for power transmission based on Power Management as claimed in claim 1, wherein each of the one or more E-Fuse chips comprises: a second operational amplifier, a third operational amplifier, a first resistor and a second resistor;
   an in-phase input end of the second operational amplifier and an inverting input end of the second operational amplifier are both used as the input end for each of the one or more E-Fuse chips, and an output end of the second operational amplifier is connected to an in-phase input end of the third operational amplifier; an inverting input end of the third operational amplifier is connected to a common end formed by a first end of the first resistor and a first end of the second resistor, a second end of the second resistor is grounded, and an output end of the third operational amplifier is connected to a second end of the first resistor, and a common end formed by the output end of the third operational amplifier and the second end of the first resistor is used as the output end for each of the one or more E-Fuse chips.

3. The apparatus for power transmission based on Power Management as claimed in claim 2, wherein each of the one or more E-Fuse chips further comprises: a third resistor;
   a first end of the third resistor is connected to the PSU, the first end of the third resistor is connected to the inverting input end of the second operational amplifier, and a second end of the third resistor is connected to the in-phase input end of the second operational amplifier for supplying power to a rear-end load, wherein the third resistor is a precision resistor.

4. The apparatus for power transmission based on Power Management as claimed in claim 3, wherein the apparatus further comprises: a fourth resistor;
   a first end of the fourth resistor is connected to the output end for each of the one or more E-Fuse chips, and a second end of the fourth resistor is connected to the input end of the current detection circuit.

5. The apparatus for power transmission based on Power Management as claimed in claim 2, wherein the second operational amplifier is configured to collect a voltage across two ends of the PSU.

6. The apparatus for power transmission based on Power Management as claimed in claim 3, wherein the third resistor is placed on a power source path and is used for detecting an output current signal on the power source path.

7. The apparatus for power transmission based on Power Management as claimed in claim 3, wherein each of the one or more E-Fuse chips collects a voltage across two ends of the third resistor, obtains an output voltage signal across the two ends of the third resistor after processed by the second operational amplifier, and amplifies the output voltage signal by means of the third operational amplifier and then outputs amplified output voltage signal to the output end for each of the one or more E-Fuse chips.

8. The apparatus for power transmission based on Power Management as claimed in claim 1, wherein the current detection circuit further comprises: a fifth resistor and a sixth resistor;
   a common end formed by a first end of the fifth resistor and a first end of the sixth resistor is connected to the inverting input end of the first operational amplifier, a second end of the fifth resistor is grounded, and a second end of the sixth resistor is connected to the output end of the first operational amplifier.

9. The apparatus for power transmission based on Power Management as claimed in claim 8, wherein the current detection circuit further comprises: a seventh resistor and an eighth resistor;
a first end of the seventh resistor, as the input end of the current detection circuit, is connected to the in-phase input end of the first operational amplifier, and a second end of the seventh resistor is grounded; and a first end of the eighth resistor is connected to the output end of the first operational amplifier, and a second end of the eighth resistor, as the output end of the current detection circuit, is connected to the input end of the VR chip.

10. The apparatus for power transmission based on Power Management as claimed in claim 9, wherein the apparatus further comprises: a ninth resistor;
a first end of the ninth resistor is connected to the input end of the VR chip, and a second end of the ninth resistor is grounded.

11. The apparatus for power transmission based on Power Management as claimed in claim 10, wherein the apparatus further comprises: a first capacitor;
a first end of the first capacitor is connected to the input end of the VR chip, and a second end of the first capacitor is grounded.

12. The apparatus for power transmission based on Power Management as claimed in claim 1, wherein there are multiple types of the one or more E-Fuse chips.

13. The apparatus for power transmission based on Power Management as claimed in claim 12, wherein in response to that there are multiple types of the one or more E-Fuse chips, a plurality of the one or more E-Fuse chips of the same type are connected in parallel, and an output end of each type of the one or more E-Fuse chips is connected to an input end of a different current detection circuit.

14. The apparatus for power transmission based on Power Management as claimed in claim 13, wherein two E-Fuse chips are used in parallel, an output end of a first E-Fuse chip is externally connected to a sixteenth resistor, and an output end of a second E-Fuse chip is externally connected to a tenth resistor; and the second end of the sixteenth resistor and a second end of the tenth resistor are connected and then connected to the in-phase input end of the first operational amplifier, an output end of a third E-Fuse chip is externally connected to an eleventh resistor.

15. The apparatus for power transmission based on Power Management as claimed in claim 14, wherein a second current detection circuit is composed of a twelfth resistor, a thirteenth resistor, a fourteenth resistor, a fifteenth resistor and a fourth operational amplifier, a first end of the fourteenth resistor R14 serves as an input end of the second current detection circuit, a second end of the fourteenth resistor is grounded, and a first end of the fourteenth resistor is connected to an in-phase input end of the fourth operational amplifier; a first end of the twelfth resistor is connected to an inverting input end of the fourth operational amplifier, and a second end of the twelfth resistor is grounded; a first end of the thirteenth resistor is connected to the inverting input end of the fourth operational amplifier, and a second end of the thirteenth resistor is connected to an output end of the fourth operational amplifier; and the output end of the fourth operational amplifier is connected to a first end of the fifteenth resistor, and a second end of the fifteenth resistor serves as an output end of the second current detection circuit.

16. The apparatus for power transmission based on Power Management as claimed in claim 14, wherein the first E-Fuse chip and the second E-Fuse chip are E-Fuse chips of the same type, but the third E-Fuse chip is an E-Fuse chip of different type from the first E-Fuse chip and the second E-Fuse chip, and amplification factors of the output ends of the first E-Fuse chip and amplification factors of the second E-Fuse chip are different from amplification factors of the third E-Fuse chip.

17. A method for power transmission based on Power Management, applied to an apparatus for power transmission based on Power Management, the method comprising:
acquiring an output current signal outputted by an Electronic Fuse (E-Fuse) chip, wherein the output current signal is obtained by converting an output voltage signal of a Power Supply Unit (PSU);
superimposing the output current signal by a first operational amplifier, and amplifying the output current signal by a preset multiple;
transmitting the output current signal amplified by the preset multiple to a Voltage Regulator (VR) chip;
acquiring the output voltage signal by the VR chip, and obtaining output power consumption by using the output current signal and the output voltage signal; and
transmitting the output power consumption to a Central Processing Unit (CPU).

18. A system for power transmission based on Power Management, comprising:
one or more memories, for storing computer-readable instructions; and
one or more processors, when executing the computer-readable instructions, cause the one or more processors to:
acquire an output current signal outputted by one or more Electronic Fuse (E-Fuse) chips, wherein the output current signal is obtained by converting an output voltage signal of a Power Supply Unit (PSU);
superimpose the output current signal by a first operational amplifier, and amplify the output current signal by a preset multiple;
transmit the output current signal amplified by the preset multiple to a Voltage Regulator (VR) chip;
acquire the output voltage signal by the VR chip, and obtain output power consumption by using the output current signal and the output voltage signal; and
transmit the output power consumption to a Central Processing Unit (CPU).

19. The system for power transmission based on Power Management as claimed in claim 18, wherein each of the one or more E-Fuse chips comprises: a second operational amplifier, a third operational amplifier, a first resistor and a second resistor;
an in-phase input end of the second operational amplifier and an inverting input end of the second operational amplifier are both used as the input end for each of the one or more E-Fuse chips, and an output end of the second operational amplifier is connected to an in-phase input end of the third operational amplifier; an inverting input end of the third operational amplifier is connected to a common end formed by a first end of the first resistor and a first end of the second resistor, a second end of the second resistor is grounded, and an output end of the third operational amplifier is connected to a second end of the first resistor, and a common end formed by the output end of the third operational amplifier and the second end of the first resistor is used as the output end for each of the one or more E-Fuse chips.

20. The system for power transmission based on Power Management as claimed in claim 19, wherein each of the one or more E-Fuse chips further comprises: a third resistor;

a first end of the third resistor is connected to the PSU, the first end of the third resistor is connected to the inverting input end of the second operational amplifier, and a second end of the third resistor is connected to the in-phase input end of the second operational amplifier for supplying power to a rear-end load, wherein the third resistor is a precision resistor.

* * * * *